I. J. ROBINSON.
Assignor to HENRY FAIRBANKS.
Try-Square and Bevel.
No. 8,058. Reissued Jan. 29, 1878.
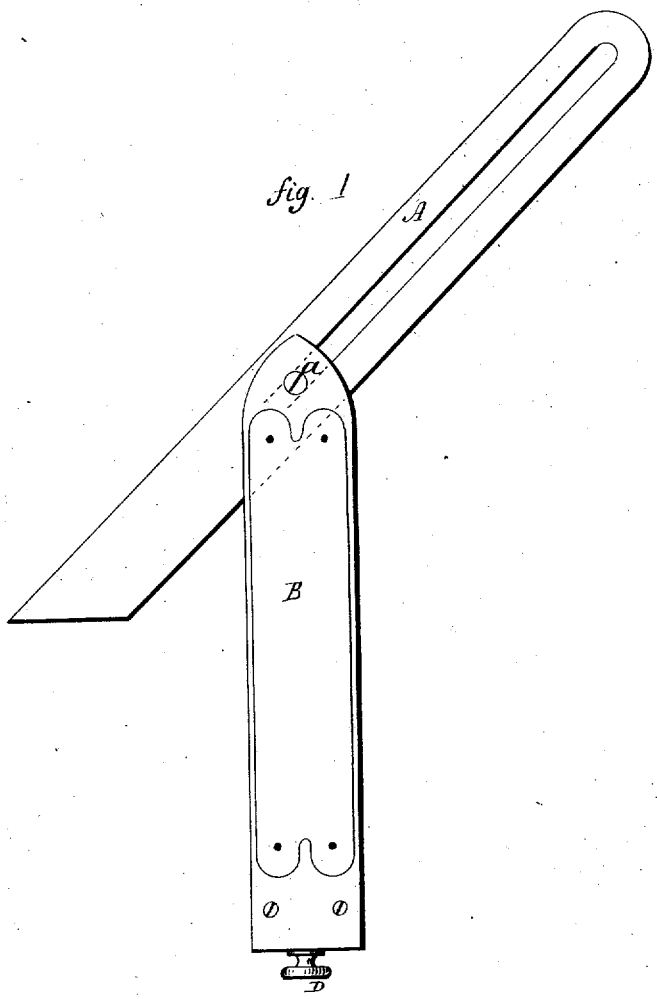
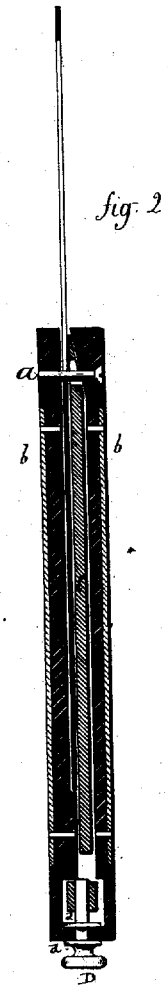
Witnesses.
J. H. Chumway
H. A. Nelson.
Isaiah J. Robinson
Inventor
By atty
Wm. E. Earle
N. PETERS, PHOTO-LITHOGRAPHER, WASHINGTON, D. C.

UNITED STATES PATENT OFFICE.

ISAIAH J. ROBINSON, OF ST. JOHNSBURY, VERMONT, ASSIGNOR TO HENRY FAIRBANKS, OF SAME PLACE.

IMPROVEMENT IN TRY-SQUARE AND BEVEL.

Specification forming part of Letters Patent No. 104,206, dated June 14, 1870; Reissue No. 8,058, dated January 29, 1878; application filed July 27, 1877.

*To all whom it may concern:*

Be it known that I, ISAIAH J. ROBINSON, of St. Johnsbury, in the county of Caledonia and State of Vermont, have invented a new Improvement in Bevel-Squares; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, vertical central section.

This invention relates to an improvement in the instrument used by joiners and others commonly termed "bevel-squares"—that is to say, a handle with a blade adjustable to different angles.

The object of the invention is to secure the blade by means of a device operated from the end of the handle opposite that in which the blade is hung; and it consists in combining, with a handle and blade of a bevel-square, a clamping mechanism to engage the blade near the pivot, and operated at the opposite end of the handle, as more fully hereinafter described.

A is the blade of the square, slotted for about half its length, in the usual manner for such instruments; B, the handle, made in two parts, *b b*, with a slot between the two, in which the blade A will turn on a pivot, *a*, passing through the slot in the blade, in the usual manner. The inner side of one of the parts of the handle is recessed to receive a sliding bar, C. At the pivot end the recess is inclined toward the blade, as seen in Fig. 2. That end of the bar C is correspondingly shaped, so that when the bar is forced toward the incline of the handle the inner surface of the bar C will be correspondingly forced inward and toward the blade, to gripe upon the surface of the blade.

The opposite end of the bar C is threaded, to engage with a thumb-screw. D, the thumb-screw, is arranged in the lower end of the handle, or the end opposite the pivot, and prevented from axial movement by shoulders *d d*. Hence, by simply turning the thumb-screw in one direction or the other, the bar C will be moved correspondingly onto or from the incline in the handle, and consequently clamp or release the blade, as the case may be. When released the blade may be adjusted to any angle, and when clamped it is securely held.

If desired, a cam or other mechanical equivalent may be used in place of the wedge-shaped bar.

By this construction the instrument is easily adjusted, and cannot readily get out of order, because the adjusting-screw D, being at the end of the handle, is not liable to the accidents to which the usual construction is subject.

I claim—

The herein-described improvement in bevel-squares, consisting in the combination of the handle, the blade hung upon a pivot in said handle, and a clamping mechanism to engage the blade near the pivot, when arranged to be operated at the opposite end of the handle.

I. J. ROBINSON.

Witnesses:
WM. B. JOHNSON,
S. R. JOHNSON.